(12) United States Patent
Okazaki et al.

(10) Patent No.: US 12,539,285 B2
(45) Date of Patent: Feb. 3, 2026

(54) THERAPEUTIC AGENT FOR HYPERTROPHIC CARDIOMYOPATHY

(71) Applicant: JUNTENDO EDUCATIONAL FOUNDATION, Bunkyo-ku (JP)

(72) Inventors: Yasushi Okazaki, Bunkyo-ku (JP);
Atsuko Okazaki, Bunkyo-ku (JP);
Osamu Minowa, Bunkyo-ku (JP);
Hideo Saotome, Bunkyo-ku (JP);
Yukiko Yatsuka, Bunkyo-ku (JP);
Katsuharu Tsuchida, Bunkyo-ku (JP);
Noriko Ichino, Bunkyo-ku (JP)

(73) Assignee: JUNTENDO EDUCATIONAL FOUNDATION, Bunkyo-ku (JP)

( * ) Notice: Subject to any disclaimer, the term of this patent is extended or adjusted under 35 U.S.C. 154(b) by 419 days.

(21) Appl. No.: 18/262,840

(22) PCT Filed: Jan. 24, 2022

(86) PCT No.: PCT/JP2022/002413
§ 371 (c)(1),
(2) Date: Jul. 25, 2023

(87) PCT Pub. No.: WO2022/158591
PCT Pub. Date: Jul. 28, 2022

(65) Prior Publication Data
US 2024/0082189 A1 Mar. 14, 2024

(30) Foreign Application Priority Data

Jan. 25, 2021 (JP) ................................. 2021-009754

(51) Int. Cl.
*A61K 31/197* (2006.01)
*A61K 33/26* (2006.01)
*A61P 9/00* (2006.01)

(52) U.S. Cl.
CPC ............ *A61K 31/197* (2013.01); *A61K 33/26* (2013.01); *A61P 9/00* (2018.01)

(58) Field of Classification Search
CPC .......... A61K 31/197; A61K 33/26; A61P 9/00
USPC ....................................................... 514/561
See application file for complete search history.

(56) References Cited

U.S. PATENT DOCUMENTS

| | | | |
|---|---|---|---|
| 12,013,389 B2 * | 6/2024 | Takada | ................ G01N 33/6893 |
| 2006/0246525 A1 | 11/2006 | Honjo et al. | |
| 2007/0249721 A1 | 10/2007 | Ito | |
| 2010/0120916 A1 | 5/2010 | Kuroiwa et al. | |
| 2021/0349079 A1 | 11/2021 | Takada et al. | |
| 2024/0173283 A1 | 5/2024 | Ikeda et al. | |

FOREIGN PATENT DOCUMENTS

| | | |
|---|---|---|
| JP | 2008-255059 A | 10/2008 |
| JP | 2011-016753 A | 1/2011 |
| WO | WO 2004/091476 A2 | 10/2004 |
| WO | WO 2005/105022 A1 | 11/2005 |
| WO | WO 2020/059242 A1 | 3/2020 |
| WO | WO 2022/202477 A1 | 9/2022 |

OTHER PUBLICATIONS

Extended European Search Report Issued Oct. 9, 2024 in European Application 22742710.1, 9 pages.
Zhao, M et al., "5-Aminolevulinic acid combined with sodium ferrous citrate ameliorates H2O2-induced cardiomyocyte hypertrophy via activation of the MAPK/Nrf2/HO-1 pathway", Am. J. Physiol. Cell. Physiol., vol. 308, 2015, pp. C665-C672.
Fujino, M. et al., "5-Aminolevulinic acid regulates the inflammatory response and alloimmune reaction", International Immunopharmacology, vol. 37, 2016, pp. 71-78.
Wigle, E.D. et al., "Hypertrophic cardiomyopathy: Clinical spectrum and treatment", Circulation, vol. 92, No. 7, Oct. 1, 1995, 32 pages.
International Search Report mailed on Mar. 8, 2022 in PCT/JP2022/002413 filed on Jan. 24, 2022 (4 pages).
JCS 2018 Guideline on Diagnosis and Treatment of Cardiomyopathies (a joint guideline by The Japanese Circulation Society and The Japanese Heart Failure Society, 2018 revised edition), 123 pages.
Shimura Masaru, et al., "Effects of 5-aminolevulinic acid and sodium ferrous citrate on fibroblasts from individuals with mitochondrial diseases", Scientific Reports (2019), vol. 9, 10549, PMID: 31332208, 11 pages.
Ono Koh et al., Chronic Disease Treatment Manual, I, Cardiovascular Disease, 7, Myocardial Disease, General Clinical Practice. 1997, vol. 46, suppl., pp. 844-849, (with partial English translation).
Kitabatake Akira et al., Cardiomyopathy: Progress in Diagnosis and Treatment. II, Progress in Diagnosis, 4, Echocardiogram Feature Findings, 1993, vol. 82, No. 2, pp. 209-214, (with partial English translation).

* cited by examiner

*Primary Examiner* — Yevgeny Valenrod
(74) *Attorney, Agent, or Firm* — Oblon, McClelland, Maier & Neustadt, L.L.P.

(57) ABSTRACT

A therapeutic agent may be effective for hypertrophic cardiomyopathy. The therapeutic agent may include 5-aminolevulinic acid, an ester thereof, or a salt thereof, as an active ingredient. A method for treating hypertrophic cardiomyopathy may include administering 5-aminolevulinic acid, an ester thereof, or a salt thereof in an effective dose, as may a method for improving left ventricular diastolic function in hypertrophic cardiomyopathy, and a method for improving myocardial relaxation rate in hypertrophic cardiomyopathy.

6 Claims, 5 Drawing Sheets

Specification includes a Sequence Listing.

```
                        SEQUENCE LISTING

<160> NUMBER OF SEQ ID NOS: 2

<210> SEQ ID NO 1
<211> LENGTH: 25
<212> TYPE: DNA
<213> ORGANISM: Artificial Sequence
<220> FEATURE:
<223> OTHER INFORMATION: target sequence of tnnt2a-MO

<400> SEQUENCE: 1
catgtttgct ctgatctgac acgca                                         25

<210> SEQ ID NO 2
<211> LENGTH: 25
<212> TYPE: DNA
<213> ORGANISM: Artificial Sequence
<220> FEATURE:
<223> OTHER INFORMATION: target sequence of standard control MO
      (Control-MO) used as a negative control

<400> SEQUENCE: 2
cctcctacct cagttacaat ttata                                         25
```

THERAPEUTIC AGENT FOR HYPERTROPHIC CARDIOMYOPATHY

CROSS-REFERENCE TO RELATED APPLICATIONS

The present application is the national stage of international application PCT/JP2022/002413, filed on Jan. 24, 2022, and claims the benefit of the filing date of Japanese Appl. No. 2021-009754, filed on Jan. 25, 2021.

TECHNICAL FIELD

The present invention relates to a therapeutic agent for hypertrophic cardiomyopathy.

BACKGROUND ART

Hypertrophic cardiomyopathy (HCM) is defined as a "disease group characterized by (1) left or right ventricular myocardial hypertrophy and (2) left ventricular diastolic dysfunction based on cardiac hypertrophy" and is designated as an intractable disease (designated intractable disease No. 58) (Non Patent Literature 1). Hypertrophic cardiomyopathy is classified into obstructive HCM causing left ventricular outflow tract obstruction and non-obstructive HCM not causing the obstruction, and the former causes left intraventricular pressure gradient during systole. There are many cases with family history of autosomal dominant HCM. Clinically, it is defined when the maximal left ventricular wall thickness is 15 mm or more (13 mm or more in those with family history of hypertrophic cardiomyopathy) in echocardiography or cardiac MRI.

Hypertrophic cardiomyopathy has characteristics that even in the earlier stage in which the left ventricular systolic function is normal and the left ventricular internal diameter is normal (or reduced), the left ventricular filling pressure increases, and disorder is observed in the left ventricular relaxation and distensibility (Non Patent Literature 1).

Most patients with hypertrophic cardiomyopathy are asymptomatic or merely have minimal symptoms, and there are quite a few cases diagnosed due to a heart murmur or an abnormal electrocardiogram accidentally found in a medical examination. If there are symptoms, they are, for example, palpitations and dizziness associated with arrhythmia, dyspnea during exercise, and chest tightness. A severe symptom is syncope.

As a treatment, excessive exercise such as competitive sports are prohibited. When there are symptoms of arrhythmia, the symptoms are improved by administration of a β-blocker, verapamil, or the like.

However, there is no therapeutic agent for improving reduced left ventricular diastolic function, which is a functional symptom of hypertrophic cardiomyopathy, that is, reduced left ventricular relaxation rate.

On the other hand, 5-aminolevulinic acid is a starting material of a porphyrin synthesis pathway and is used not only as a photosensitizer in, for example, photodynamic therapy (treatment of actinic keratosis, acne, skin cancer, and so on) and photodynamic diagnosis (intraoperative diagnosis of brain tumor, transurethral resection of bladder tumor, and so on) but also as a plant growth promoter. It has been also reported that 5-aminolevulinic acid can be used in combination with an iron compound in a hair growth agent (Patent Literature 1), enzyme enhancement therapy for mitochondrial disease (Non Patent Literature 2), and so on.

Furthermore, it has also been reported that 5-aminolevulinic acid has an effect of increasing the succinyl-CoA level in myocardial cells in an animal model with acute myocardial infarction (Patent Literature 2).

CITATION LIST

Patent Literature

Patent Literature 1: WO 2005/105022
Patent Literature 2: WO 2020/59242

Non Patent Literature

Non Patent Literature 1: Guideline on Diagnosis and Treatment of Cardiomyopathies (a joint guideline by The Japanese Circulation Society and The Japanese Heart Failure Society, 2018 revised edition)
Non Patent Literature 2: Scientific Reports (2019) 9: 10549, PMID: 31332208

SUMMARY OF INVENTION

Technical Problem

It is an object of the present invention to provide a new therapeutic agent for hypertrophic cardiomyopathy.

Solution to Problem

Accordingly, the present inventors have searched for drugs that affect the myocardial relaxation rate, which is an indicator of left ventricular diastolic function, by using myocardial cells derived from iPS cells of hypertrophic cardiomyopathy patient and have found that 5-aminolevulinic acid has a strong effect of improving the myocardial relaxation rate and further improves the left ventricular diastolic function, and the present invention has been accomplished.

That is, the present invention provides the following inventions [1] to [24]:

[1] A therapeutic agent for hypertrophic cardiomyopathy, comprising 5-aminolevulinic acid, an ester thereof, or a salt thereof as an active ingredient;
[2] An agent for improving the left ventricular diastolic function in hypertrophic cardiomyopathy, comprising 5-aminolevulinic acid, an ester thereof, or a salt thereof as an active ingredient;
[3] An agent for improving the myocardial relaxation rate in hypertrophic cardiomyopathy, comprising 5-aminolevulinic acid, an ester thereof, or a salt thereof as an active ingredient; [4] A therapeutic agent for hypertrophic cardiomyopathy, comprising 5-aminolevulinic acid, an ester thereof, or a salt thereof and an iron compound;
[5] An agent for improving the left ventricular diastolic function in hypertrophic cardiomyopathy, comprising 5-aminolevulinic acid, an ester thereof, or a salt thereof and an iron compound;
[6] An agent for improving the myocardial relaxation rate in hypertrophic cardiomyopathy, comprising 5-aminolevulinic acid, an ester thereof, or a salt thereof and an iron compound;
[7] Use of 5-aminolevulinic acid, an ester thereof, or a salt thereof for manufacturing a therapeutic agent for hypertrophic cardiomyopathy;

[8] Use of 5-aminolevulinic acid, an ester thereof, or a salt thereof for manufacturing an agent for improving the left ventricular diastolic function in hypertrophic cardiomyopathy;

[9] Use of 5-aminolevulinic acid, an ester thereof, or a salt thereof for manufacturing an agent for improving the myocardial relaxation rate in hypertrophic cardiomyopathy;

[10] Use of a combination of 5-aminolevulinic acid, an ester thereof, or a salt thereof and an iron compound for manufacturing a therapeutic agent for hypertrophic cardiomyopathy; [11] Use of a combination of 5-aminolevulinic acid, an ester thereof, or a salt thereof and an iron compound for manufacturing an agent for improving the left ventricular diastolic function in hypertrophic cardiomyopathy;

[12] Use of a combination of 5-aminolevulinic acid, an ester thereof, or a salt thereof and an iron compound for manufacturing an agent for improving the myocardial relaxation rate in hypertrophic cardiomyopathy;

[13] 5-Aminolevulinic acid, an ester thereof, or a salt thereof for use in treatment of hypertrophic cardiomyopathy;

[14] 5-Aminolevulinic acid, an ester thereof, or a salt thereof for use in improvement of the left ventricular diastolic function in hypertrophic cardiomyopathy;

[15] 5-Aminolevulinic acid, an ester thereof, or a salt thereof for use in improvement of the myocardial relaxation rate in hypertrophic cardiomyopathy;

[16] A combination of 5-aminolevulinic acid, an ester thereof, or a salt thereof and an iron compound for use in treatment of hypertrophic cardiomyopathy;

[17] A combination of 5-aminolevulinic acid, an ester thereof, or a salt thereof and an iron compound for use in improvement of the left ventricular diastolic function in hypertrophic cardiomyopathy;

[18] A combination of 5-aminolevulinic acid, an ester thereof, or a salt thereof and an iron compound for use in improvement of the myocardial relaxation rate in hypertrophic cardiomyopathy;

[19] A method for treating hypertrophic cardiomyopathy, comprising administering 5-aminolevulinic acid, an ester thereof, or a salt thereof in an effective dose;

[20] A method for improving the left ventricular diastolic function in hypertrophic cardiomyopathy, comprising administering 5-aminolevulinic acid, an ester thereof, or a salt thereof in an effective dose;

[21] A method for improving the myocardial relaxation rate in hypertrophic cardiomyopathy, comprising administering 5-aminolevulinic acid, an ester thereof, or a salt thereof in an effective dose;

[22] A method for treating hypertrophic cardiomyopathy, comprising administering a combination of 5-aminolevulinic acid, an ester thereof, or a salt thereof and an iron compound;

[23] A method for improving the left ventricular diastolic function in hypertrophic cardiomyopathy, comprising administering a combination of 5-aminolevulinic acid, an ester thereof, or a salt thereof and an iron compound; and

[24] A method for improving the myocardial relaxation rate in hypertrophic cardiomyopathy, comprising administering a combination of 5-aminolevulinic acid, an ester thereof, or a salt thereof and an iron compound.

Advantageous Effects of Invention

Use of 5-aminolevulinic acid, an ester thereof, or a salt thereof improves the myocardial relaxation rate, which is an indicator of the left ventricular diastolic function in hypertrophic cardiomyopathy, and enables treatment of hypertrophic cardiomyopathy by improving the left ventricular diastolic dysfunction that is essential in hypertrophic cardiomyopathy.

DESCRIPTION OF EMBODIMENTS

The active ingredient of the therapeutic agent for hypertrophic cardiomyopathy of the present invention is 5-aminolevulinic acid, an ester thereof, or a salt thereof.

5-Aminolevulinic acid, an ester thereof, or a salt thereof (hereinafter, they may be collectively referred to as 5-aminolevulinic acids) is described in, for example, Patent Literature 1 and is publicly known.

However, the relaxation rate-improving effect of the 5-aminolevulinic acids in hypertrophic cardiomyopathy has not been known.

Examples of the 5-aminolevulinic acid ester include C1-C24 linear, branched, or cyclic alkyl esters optionally having a substituent such as a hydroxy group, an alkoxy group, a phenyl group, a benzyl group, or a hydroxymethyl group. Specific examples of the 5-aminolevulinic acid ester include 5-aminolevulinic acid methyl ester, 5-aminolevulinic acid ethyl ester, 5-aminolevulinic acid isopropyl ester, 5-aminolevulinic acid hexyl ester, 5-aminolevulinic acid cyclohexyl ester, 5-aminolevulinic acid heptyl ester, 5-aminolevulinic acid octyl ester, 5-aminolevulinic acid nonyl ester, 5-aminolevulinic acid dodecyl ester, 5-aminolevulinic acid hexadecyl ester, 5-aminolevulinic acid benzyl ester, 5-aminolevulinic acid phenethyl ester, 5-aminolevulinic acid phenylpropyl ester, 5-aminolevulinic acid hydroxyethyl ester, and 5-aminolevulinic acid ethoxyethyl ester.

Examples of the salt form of 5-aminolevulinic acid or an ester thereof include inorganic acid salts, such as a phosphate, a hydrochloride, a nitrate, and a sulfate; organic acid salts, such as an acetate, a propionate, a butyrate, a valerate, a citrate, a fumarate, a maleate, a malate, a succinate, an oxalate, a lactate, a tartrate, and a glycolate; alkali metal salts, such as a sodium salt and a potassium salt; and alkaline earth metal salts, such as a calcium salt.

As shown in Examples below, the 5-aminolevulinic acids have an effect of noticeably improving the myocardial relaxation rate, which is an indicator of a left ventricular diastolic function using myocardial cells derived from iPS cells of hypertrophic cardiomyopathy patient. In addition, 5-aminolevulinic acids improve the myocardial relaxation rate by improving the function of taking $Ca^{2+}$ into sarcoplasmic reticulum. Furthermore, 5-aminolevulinic acids improve the left ventricular diastolic function in-vivo.

Accordingly, the 5-aminolevulinic acids are useful as an agent for improving the myocardial relaxation rate in hypertrophic cardiomyopathy, an agent for improving the left ventricular diastolic function in hypertrophic cardiomyopathy, or a therapeutic agent for hypertrophic cardiomyopathy.

Although the 5-aminolevulinic acids can be used alone as a therapeutic agent for hypertrophic cardiomyopathy, the 5-aminolevulinic acids are preferably used in a combination with an iron compound from the viewpoint of further enhancing the effects above by supplying an iron compound present in vivo.

Here, examples of the iron compound include an iron complex and an iron salt.

Examples of the iron complex include heme iron, dextran iron, iron sodium diethylenetriaminepentaacetate, iron ammonium diethylenetriaminepentaacetate, iron sodium ethylenediaminetetraacetate, iron ammonium ethylenediaminetetraacetate, triethylenetetramine iron, and iron sodium dicarboxymethylglutamate.

As the iron salt, one or more selected from iron salts of organic acids and iron salts of inorganic acids are used. Specific examples of the iron salt include ferrous citrate, sodium ferrous citrate, ferric ammonium citrate, iron acetate, iron oxalate, ferrous succinate, iron and sodium succinate citrate, ferrous pyrophosphate, ferric pyrophosphate, iron lactate, ferrous gluconate, ferrous formate, ferric formate, potassium ferric ammonium oxalate, ferrous sulfate, ferric sulfate, ferric ammonium sulfate, ferric carbonate, ferrous chloride, and ferric chloride.

The content of the iron compound is not particularly limited and is preferably from 0.01 parts by mass to 1 part by mass, more preferably from 0.05 parts by mass to 1 part by mass, and further preferably from 0.1 parts by mass to 1 part by mass with respect to 1 part by mass of the 5-aminolevulinic acids.

As the administration route of the therapeutic agent of the present invention, both systemic administration and local administration and both an oral route and a parenteral route can be selected according to the disease, symptoms, and so on, and a suitable dosage form, for example, oral administration in the form of a tablet, a pill, a capsule, a granule, a powder, a liquid, or the like or parenteral administration in the form of an injection (e.g., intravenous injection or intramuscular injection), a suppository, a transdermal agent, a intranasal agent, an inhalant, or the like can be selected according to the administration method and route.

Examples of the therapeutic agent for oral administration according to the present invention include solid preparations such as a tablet, a capsule, a powder, and a granule. These preparations are manufactured by mixing the active ingredient with an excipient, a lubricant, a disintegrant, a solubilizer, and so on according to an ordinary method. Examples of the excipient include lactose, cellulose, mannitol, and glucose. Examples of the lubricant include magnesium stearate. Examples of the disintegrant include sodium carboxymethyl starch, polyvinylpyrrolidone, and croscarmellose sodium. The tablet or pill may be coated with sugar or a gastric or enteric coating as needed.

The therapeutic agent for oral administration may be a pharmacologically acceptable liquid preparation such as an extract, an emulsion, a liquid, a suspension, a syrup, a spirit, or an elixir. Such a preparation contains an inert solvent (e.g., purified water or ethanol) that is commonly used and may further contain a solubilizing agent, a wetting agent, a suspending agent, a sweetening agent, a flavoring agent, an aromatic agent, a buffer (e.g., sodium citrate), a stabilizer, or a preservative.

Examples of the therapeutic agent for parenteral administration include an injection such as a sterile aqueous or non-aqueous liquid, suspension, or emulsion, an ointment, a lotion, a sublingual preparation or buccal patch for buccal administration, an aerosol agent for transnasal administration, and a suppository.

Injections can be administered, for example, subcutaneously, intradermally, or intramuscularly, in addition to usual intravenous administration or intraarterial administration. Examples of the aqueous solvent for injection include distilled water and physiological saline solution. Examples of the non-aqueous solvent for injection include propylene glycol, polyethylene glycol, and vegetable oil, such as olive oil; alcohols, such as ethanol; and polysorbate 80 (name in the Japanese Pharmacopoeia).

These preparations may further contain an isotonicity agent (e.g., sodium chloride or glucose), a preservative, a wetting agent, an emulsifier, a dispersing agent, a stabilizer, a pH adjuster (e.g., sodium citrate, sodium acetate, or sodium phosphate), a buffer, a local anesthetic (e.g., procaine hydrochloride or lidocaine hydrochloride), or a solubilizer.

These preparations may be sterilized by, for example, filtration through a bacteria-retaining filter, addition of a germicide, or irradiation.

The dose of the therapeutic agent of the present invention varies depending on the administration route, symptoms, age, and so on but is usually preferably from 10 mg to 1 g a day in terms of the amount of the 5-aminolevulinic acids for an adult.

EXAMPLES

The present invention will now be described in more detail with reference to Examples, but is not limited to these Examples.

Example 1

(1) Myocardial Cells Derived from iPS Cells of Hypertrophic Cardiomyopathy Patient Myocardial cells differentiated from iPS cells derived from hypertrophic cardiomyopathy patient were purchased, seeded, and cultured and were then administered with 5-aminolevulinic acid and sodium ferrous citrate (ALA/SFC). As myocardial cells, 4 M Mycell Cardiomyocytes (MYH7 R403Q) (C1081, cat. #556-34781) (FUJIFILM Cellular Dynamics, Inc.) was used. As a control, myocardial cells derived from iPS cells of normal subject (Cell Cardiomyocytes (Control) (C1056, cat. #551-33491) (FUJIFILM Cellular Dynamics, Inc.) was used. As the culture medium for cell seeding, (iCell Plating medium (M1001, cat. #550-33581) (FUJIFILM Cellular Dynamics, Inc.) was used.

In the cell culture, as the culture medium, iCell Maintenance medium (M1003, cat. #557-3359I) (FUJIFILM Cellular Dynamics, Inc.) was used.

(2) The Above-Described Myocardial Cells Derived from iPS Cells of Hypertrophic Cardiomyopathy Patient were Subjected to Experiments by the Following Schedule.
Test Schedule:
- Day 1: Cell seeding (myocardial cells derived from iPS cells of hypertrophic cardiomyopathy patient, myocardial cells derived from iPS cells of normal subject). The cells were seeded at $3×10^4$ per well in a 96-well plastic plate (nunc);
- Day 15: The relaxation rate before administration was measured using SONY SI8000, and ALA/SFC were then administered on the same day at the following doses. The doses were four groups of 0 µM/0 µM, 10 µM/5 µM, 30 µM/1 µM, and 100 µM/50 µM of ALA/SFC for each of the disease myocardial cells and the normal myocardial cells. The agents were dissolved in an iCell Maintenance medium (M1003) so as to give the above respective concentrations, and administration was then performed by replacing the culture medium in each well by these media.

The relaxation rate was measured before administration on the Day 15 and twice after administration as described below, three times in total; Day 18: 2nd ALA/SFC administration;
- Day 20: 1st measurement of the relaxation rate after administration was performed using SONY SI8000, 3rd administration of ALA/SFC was then performed on the same day;
- Day 22: 4th administration of ALA/SFC was performed;
- Day 24: 5th administration of ALA/SFC was performed;
- Day 26: 2nd measurement of the relaxation rate after administration was performed using SONY SI8000.

Figure 1:
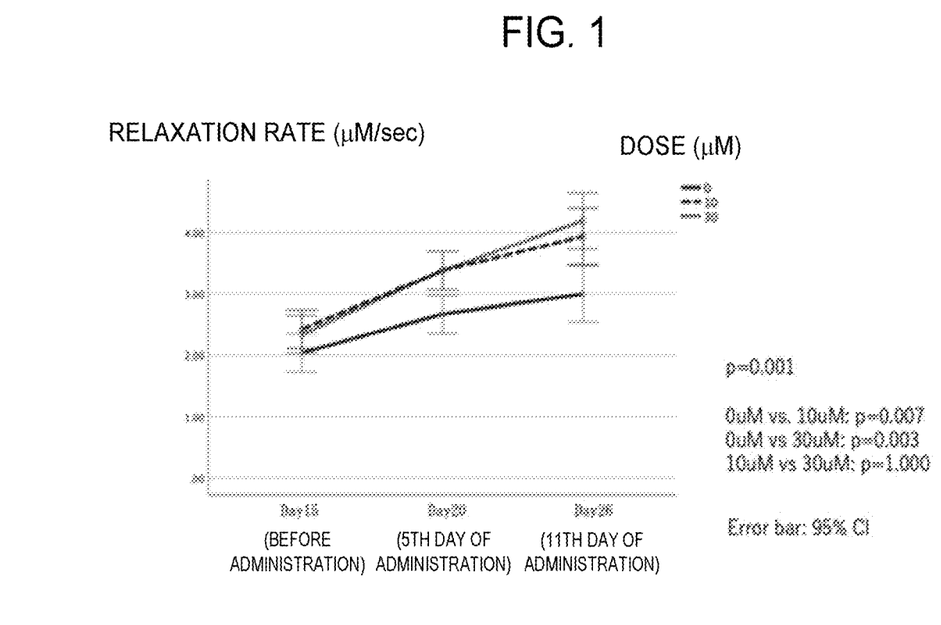
FIG. 1 shows myocardial relaxation rates in myocardial cells derived from iPS cells of hypertrophic cardiomyopathy patient and the effects of 5-aminolevulinic acid on the relaxation rates.

The myocardial relaxation rates in myocardial cells derived from iPS cells of hypertrophic cardiomyopathy patient and the effects of 5-aminolevulinic acid on the relaxation rates are shown in FIG. 1. As shown in FIG. 1, the relaxation rate in hypertrophic cardiomyopathy was 2.3±0.6 µM±standard deviation) and was significantly lower than the relaxation rate of the normal myocardial cells. As compared with this low relaxation rate, addition of 5-aminolevulinic acid noticeably increased the relaxation rate of myocardial cells in hypertrophic cardiomyopathy.

Figure 2:
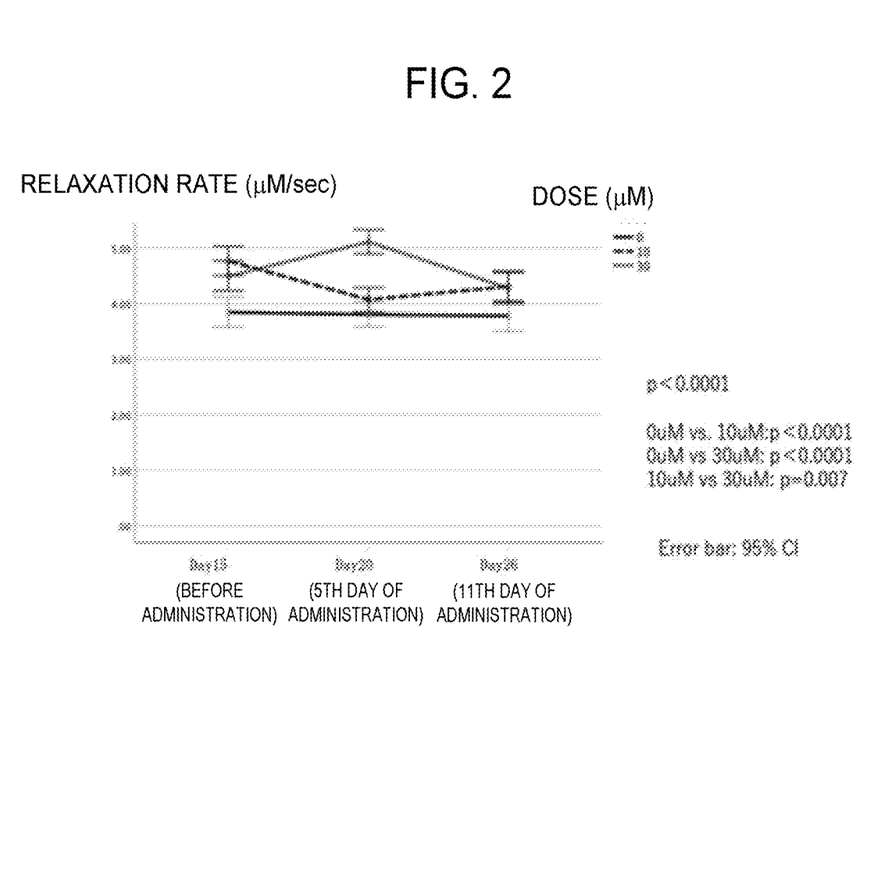
FIG. 2 shows myocardial relaxation rates in a normal control (normal myocardial cells) and the effects of 5-aminolevulinic acid on the relaxation rates.

FIG. 2 shows myocardial relaxation rate in normal myocardial cells (normal myocardial control) and the effect of 5-aminolevulinic acid on the relaxation rate.

Figure 3:
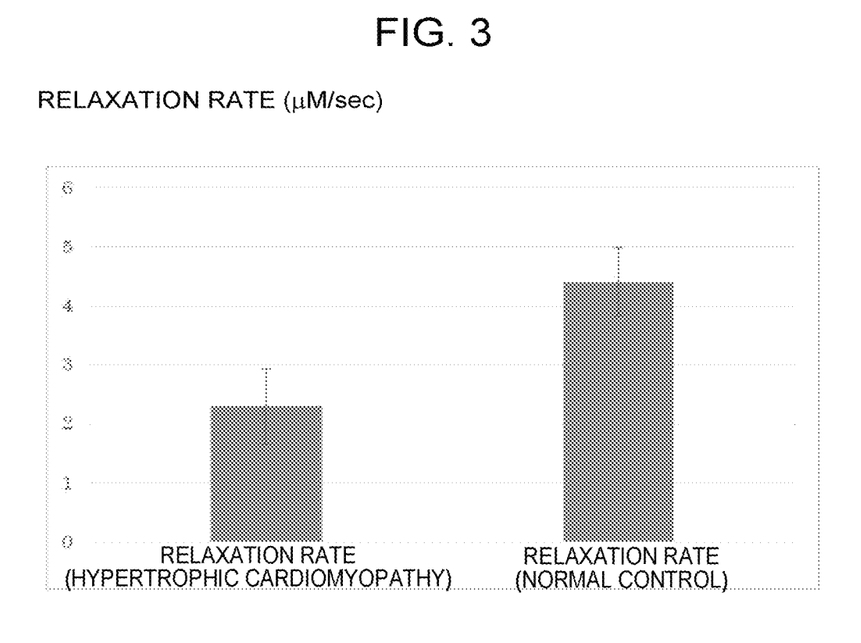
FIG. 3 shows comparison of relaxation rates between myocardial cells derived from iPS cells of hypertrophic cardiomyopathy patient and normal myocardial cells.

As shown in FIG. 2, the relaxation rate of myocardial cells in hypertrophic cardiomyopathy was 4.4±0.6 µM/sec (average±standard deviation), and as compared with this relaxation rate, even addition of 5-aminolevulinic acid did not increase the relaxation rate over time. The comparison of the relaxation rates in both cells is shown in FIG. 3.

Accordingly, it was demonstrated that 5-aminolevulinic acids improve reduced myocardial relaxation rate in hypertrophic cardiomyopathy and improve the myocardial diastolic function.

Example 2

The determinant of the myocardial relaxation rate is the dissociation rate of myosin and actin, and one of factors of determining the dissociation rate is the $Ca^{2+}$ uptake function of ATPase present in the longitudinal tubules of sarcoplasmic reticulum. Accordingly, using the above-mentioned myocardial cells derived from iPS cells of hypertrophic cardiomyopathy (HCM) patient, the peak width of a Ca-imaging waveform, which reflects the disappearance rate of $Ca^{2+}$ in myocardial cells (i.e., the uptake rate of $Ca^{2+}$ into the sarcoplasmic reticulum) by addition of 5-aminolevulinic acid, was measured.

(1) Myocardial cells induced from iPS Cell as a hypertrophic cardiomyopathy (HCM) model, namely myocardial cells (obtained from CDI Co.) derived from iPS Cell of hypertrophic cardiomyopathy patient were seeded in a 96-well plate under the following conditions. The density of the cells was adjusted to $3×10^4$/well. The culture medium for seeding used was iPs Cardiomyocyte Plating Medium (IPMM; M1001, cat. #550-33581) manufactured by CDI Co. (FUJI-FILM Cellular Dynamics, Inc.), and in the long-term culture, iPs Cardiomyocyte Maintenance Medium (ICMM; M1003, cat. #557-3359I) culture medium (100 µL/well) was used. The long-term culture (one month) was performed under the conditions of 37° C. and 7% $CO_2$. Calcium imaging measurement was performed on the 7th day, 14th day, and 21st day after the seeding. As the calcium fluorometry reagent, EarlyTox or Ca1520 were used at a final concentration of 10 nM or 50 nM, respectively. 5-Aminolevulinic acid was added to the culture medium on the 7th day after the seeding, and was continuously administered at each concentration until the imaging measurement on the 14th day and the 21st day.

(2) Condition for Fluorescent Calcium Imaging

As the measurement apparatus for high content analysis, CQ1 Image Cytometer of Yokogawa Electric Corporation was used, and the measurement was performed with excitation light of 488 nm and fluorescence at 500 to 550 nm (spinning-disk confocal unit with microlens array). Measurement specifications: measurement fluorescent filter: filter cube transmitting about 500 to 550 nm (bandpass: 50 nm), 20× dry objective lens (UPLSAPO 20×), confocal pinhole: 50 µm, sCMOS 2,560×2,160 pixels: 16.6×14.0 mm, obtained image size: 500×500, and moving image acquisition temporal resolution: 20 fps. Environment in stage: 37° C., 5% $CO_2$, humidification. Acquisition of image data and transfer to outside were performed using analysis software, CellPathfinder.

(3) Data Analysis Method

Over the entire screen of the obtained image data, the fluorescence intensity was digitized over time to obtain fluorescence waveforms. These numerical data were subjected to waveform analysis by waveform analysis software, Web Finder. The parameters calculated from a waveform were the line width (sec) at each of 10%, 20%, 30%, 50%, 70%, and 90% of the waveform height, the length (sec) of interval between each wave, and the fluorescence intensity (ΔF).

Figure 4:
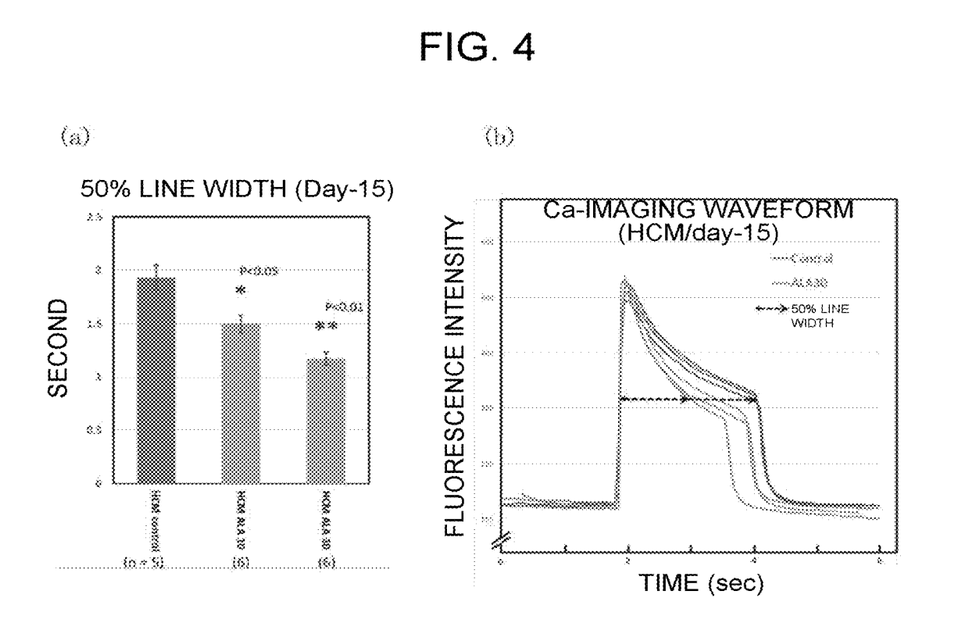
FIG. 4 shows the influence of addition of 5-aminolevulinic acid on the change of the peak width of a Ca-imaging waveform, which reflects the disappearance rate of $Ca^{2+}$ in myocardial cells (i.e., the uptake rate of $Ca^{2+}$ into the sarcoplasmic reticulum). a. normal control (n=5), 10 μM of 5-aminolevulin (n=6), and 30 μM of 5-aminolevulin (n=6); b. one from each of normal control (n=5) and 30 μM of 5-aminolevulin (n=6), i.e., the 3rd data out of the 5 samples in the order of wells in the former and similarly, the 4th data out of the 6 samples in the latter are selected, and the 3 beats of each data were overwritten by overlaying the peak times.

The results are shown in FIG. 4. As obvious from FIG. 4, it was demonstrated that the peak width at 50% of the height of a waveform was obviously reduced by addition of 5-aminolevulinic acid to improve the uptake function of $Ca^{2+}$ into sarcoplasmic reticulum.

Example 3

The effect of 5-aminolevulinic acid on a zebrafish cardiomyopathy model has been studied.
(1) Production of Zebrafish Cardiomyopathy Model (Myocardial Troponin T Knockdown (tnnt2a KD))

A synthetic nucleic acid, morpholino antisense oligo (MO), which inhibits translation of zebrafish myocardial troponin T (tnnt2a), was used. The target sequence of tnnt2a-MO used for producing this cardiomyopathy model was 5'-CATGTTTGCTCTGATCTGACACGCA-3' (SEQ ID NO: 1), and the target sequence of standard control MO (Control-MO) used as a negative control was 5'-CCTCC-TACCTCAGTTACAATTTATA-3' (SEQ ID NO: 2). Both MOs used were produced by Certified GeneTool, Inc. Standard control MO (Lis-MO) having the 3' terminal labeled with a red fluorescent material, Lissamine, was used as an internal standard substance. An MO powder diluted with nuclease free water to 1 mM was used as a stock solution, and the final concentrations of the tnnt2a-MO and Control-MO were adjusted to 1.2 µM and the final concentration of Lis-MO was adjusted to 50 µM, using nuclease free water as a working solution for microinjection. A glass needle produced by processing a glass capillary (GD-1, Narishige) using a puller (PC-100, Narishige) was filled with the working solution of MO and was connected to the injection holder of a DNA injection set (IM-400, 0.2LE-8SBZN, MMO-220C, M-152, GJ-1, and IP, Narishige). Adult zebrafish (RIKEN-WT) was naturally mated. Fertilized eggs from the same parents were acquired, and approximately 3 nL of the working solution was injected per fertilized egg in one- to four-cell stages. After the microinjection, the fertilized eggs were transferred to a 10-cm petri dish (Asnol Sterilization Petri Dish) and were grown using a typical culture solution, E2 Medium, in an incubator set to 28° C.

(2) The Effect of 5-Aminolevulinic Acid was Studied by the Following Experiment Schedule:

DAY 0 (7 to 8 hours post-fertilization): about 50 embryos were transferred to another 10-cm petri dish, and E2 Medium containing 0.003% 1-phenyl-2-thiourea (P7629, Sigma-Aldrich Co. LLC) for the purpose of inhibiting generation of melanin pigment was used as a culture solution. ALA/SFC were adjusted to 100 µM/50 µM for the experiment group, and ALA/SFC were adjusted to 0 µM/0 µM for the control group;

DAY 1: 2nd administration of ALA/SFC was performed;
DAY 2: 3rd administration of ALA/SFC was performed; and
DAY 3: Under non-anesthesia, an individual was mounted on a 3-cm glass bottom dish (Greiner Bio-One International GmbH) using 1% low-melting point agarose gel, and heart imaging was performed in a bright field using a 20 times magnification objective lens installed in an inverted microscope CKX53 (Olympus Corporation) to acquire a moving image.

(3) Image Analysis was Performed Using ImageJ as Follows.

The acquired moving image was converted into sequence images, and the ventricular outline in each frame was recorded as Region of Interest (ROT). Subsequently, the major and minor axes of an ellipse approximating to the ROI on each sequence image were measured by Fit-to-Ellipse algorithm, the volume of the spheroid of each sequence image was calculated as a ventricular volume, and the peak filling rate (PFR: diastolic function) was measured from the rate of change in the obtained ventricular volume.

Figure 5:
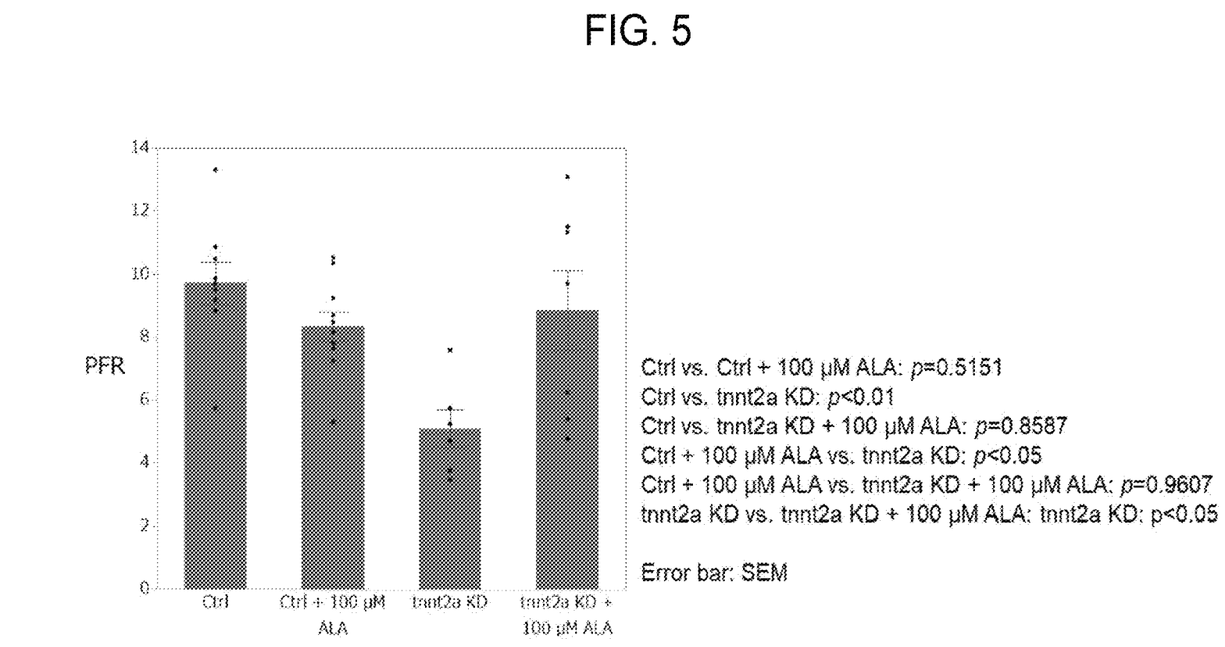
FIG. 5 shows the effect of 5-aminolevulinic acid on left ventricular myocardial diastolic function in a zebrafish cardiomyopathy model.

The results are shown in FIG. 5. As obvious from FIG. 5, it was demonstrated that the left ventricular diastolic function in an in vivo cardiomyopathy model is improved by administration of 5-aminolevulinic acid.

The invention claimed is:

1. A method for treating hypertrophic cardiomyopathy, comprising administering 5-aminolevulinic acid, an ester thereof, or a salt thereof in an effective dose.

2. A method for improving left ventricular diastolic function in hypertrophic cardiomyopathy, comprising administering 5-aminolevulinic acid, an ester thereof, or a salt thereof in an effective dose.

3. A method for improving myocardial relaxation rate in hypertrophic cardiomyopathy, comprising administering 5-aminolevulinic acid, an ester thereof, or a salt thereof in an effective dose.

4. The method of claim 1, wherein the administering comprises administering a combination comprising the 5-aminolevulinic acid, ester, or salt thereof.

5. The method of claim 2, wherein the administering comprises administering a combination comprising the 5-aminolevulinic acid, ester, or salt thereof, and an iron compound.

6. The method of claim 3, wherein the administering comprises administering a combination comprising the 5-aminolevulinic acid, ester, or salt thereof, and an iron compound.

* * * * *